US008781328B2

United States Patent
Patel et al.

(10) Patent No.: US 8,781,328 B2
(45) Date of Patent: *Jul. 15, 2014

(54) GREEDY CHANNEL SELECTION PROCEDURE FOR THE ROUTING, WAVELENGTH ASSIGNMENT AND SPECTRUM ALLOCATION IN THE FLEXIBLE OPTICAL WDM NETWORKS

(75) Inventors: Ankitkumar Patel, E. Brunswick, NJ (US); Philip Nan Ji, Princeton, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 164 days.

This patent is subject to a terminal disclaimer.

(21) Appl. No.: 13/236,535

(22) Filed: Sep. 19, 2011

(65) Prior Publication Data

US 2012/0070150 A1    Mar. 22, 2012

Related U.S. Application Data

(60) Provisional application No. 61/384,132, filed on Sep. 17, 2010.

(51) Int. Cl.
*H04J 14/02* (2006.01)

(52) U.S. Cl.
USPC ................... 398/79; 398/75; 398/95; 398/57; 398/47

(58) Field of Classification Search
CPC . H04J 14/026; H04J 14/0267; H04J 14/0224; H04J 14/0257; H04J 14/02; H04J 14/0204; H04J 14/0238; H04J 14/0227

USPC ........... 398/43, 45, 47, 57, 52, 58, 79, 75, 95, 398/49

See application file for complete search history.

(56) References Cited

U.S. PATENT DOCUMENTS

| | | | |
|---|---|---|---|
| 7,088,922 B2* | 8/2006 | Tomofuji et al. | 398/95 |
| 7,313,325 B2* | 12/2007 | Han et al. | 398/25 |
| 7,586,845 B2* | 9/2009 | Inagi | 370/232 |
| 8,086,103 B2* | 12/2011 | Beacken et al. | 398/69 |
| 8,260,140 B2* | 9/2012 | Luo et al. | 398/87 |
| 8,644,704 B2* | 2/2014 | Vassilieva et al. | 398/26 |
| 2005/0069314 A1* | 3/2005 | De Patre et al. | 398/5 |
| 2010/0158528 A1* | 6/2010 | Resende et al. | 398/79 |
| 2010/0183299 A1* | 7/2010 | Solheim et al. | 398/34 |
| 2011/0235692 A1* | 9/2011 | Kanellakopoulos et al. | 375/222 |
| 2012/0069856 A1* | 3/2012 | Patel et al. | 370/480 |
| 2012/0070148 A1* | 3/2012 | Patel et al. | 398/49 |
| 2012/0201541 A1* | 8/2012 | Patel et al. | 398/58 |
| 2012/0251117 A1* | 10/2012 | Patel et al. | 398/79 |
| 2013/0272711 A1* | 10/2013 | Patel et al. | 398/79 |
| 2014/0016939 A1* | 1/2014 | Patel et al. | 398/79 |

* cited by examiner

*Primary Examiner* — Daniel Washburn
*Assistant Examiner* — Hibret Woldekidan
(74) *Attorney, Agent, or Firm* — Joseph Kolodka

(57) ABSTRACT

The inventive method, implemented in an optical flexible wavelength division multiplexing FWDM network, includes finding a connection route in an optical FWDM network on which a channel with sufficient spectrum is available at lowest wavelength among all available channels, finding K channels at first available K lower wavelengths out of available channels for minimizing total required spectrum; and selecting a channel which is routed through minimum number of optical fiber paths out of the K available channels at one of the lower wavelengths.

2 Claims, 4 Drawing Sheets

GREEDY CHANNEL SELECTION PROCEDURE FOR THE ROUTING, WAVELENGTH ASSIGNMENT AND SPECTRUM ALLOCATION IN THE FLEXIBLE OPTICAL WDM NETWORKS

This application claims the benefit of the following U.S. Provisional Application No. 61/384,132, entitled, "Greedy Channel Selection Procedure for the Routing, Wavelength Assignment and Spectrum Allocation in the Flexible Optical WDM Networks", filed Sep. 17, 2010, is related to co-pending U.S. patent application Ser. No. 13/234,979, entitled, "RATE SELECTION FOR CHANNEL SELECTION IN FLEXIBLE WDM NETWORKS", filed Sep. 16, 2011, and co-pending U.S. patent application Ser. No. 13/236,460, entitled "K-Alternative Channel Selection Procedure for the Routing, Wavelength Assignment, and Spectrum Allocation in the Flexible Optical WDM Networks" filed Sep. 17, 2011, all of which whose contents are incorporated herein by reference.

BACKGROUND OF THE INVENTION

The present invention relates generally to optical communications and more particularly to Greedy Channel Selection Procedure for the Routing, Wavelength Assignment and Spectrum Allocation in the Flexible Optical WDM Networks.

The channel spacing in the current optical WDM networks is fixed and same for all channels, standardized by the ITU-T [ITU-T], irrespective of the line rate of channels (FIG. 1(a)). Such networks herein are referred to as fixed grid networks. Fixed spectrum assigned to channels in the fixed grid networks may not be sufficient if the channels require larger spectral width to support higher line rates. On the other hand, if channels are operating at low line rates, then the required spectrum may be smaller than the assigned spectrum. Thus, in a mixed line rate system, the spectrum efficiency is not optimized for each line rate in the fixed grid networks.

There has been growing research interests on optical WDM systems that are not limited to fixed ITU-T channel grid, but offer flexible channel grid to increase the spectral efficiency Herein, Applicants refer to such networks as the Flexible optical WDM networks (FWDM) (FIG. 1(b)). Some important problems in the FWDM networks are: for a given configuration of the optical network in terms of location of optical nodes and the deployed fibers connecting optical nodes, and a given set of connections with finite data rates between two disjoint optical nodes, i) how to find a set of all-optical channels (channels are distinguished based on its operating wavelength and spectrum allocation) which can support the requested data rate for each connection; ii) how to select the line rate of channels for each connection to support the required data rates; and iii) how to route these channel in the network, such that the total required spectrum for the optical WDM network is minimized. Channels which transfer the data between end users without converting them into electrical domain are referred to as the All-Optical channels. Together the problems described above are referred to as the Routing, Wavelength assignment, and Spectrum Allocation (RWSA) in the all-optical flexible optical WDM networks.

Since in the fixed grid networks, the spectrum, assigned to each channel, is fixed and remains the same for all channels, the channel can be distinguished based only on its operating wavelength. Thus, the RWSA problem is transformed into the Routing, and Wavelength Assignment problem.

The RWA is the special case of the RWSA problem in which the spectral width of all channels is the same. When finding a connection in all-optical fixed grid WDM networks using the RWA solutions, we need to make sure that the same wavelength is available on all fiber cables along the route, which we refer as the wavelength continuity constraint. On the other hand, when finding a connection in the FWDM networks, the RWSA solutions need to satisfy not only the wavelength continuity constraint, but also make sure that the same continuous spectrum is available on each fiber in the link, which we refer as the spectral continuity constraint. Additionally, the spectrum allocation to different channels must be non-overlapping, which we refer as spectral conflict constraint. Thus, due to spectral continuity and spectral conflict constraints, existing solutions for the RWA problem may not be applicable to the RWSA problem.

This problem for the first time in has been introduced with a proposed mathematical formulation of the problem in terms of Integer Linear Program (ILP). The time required to solve the RWSA problem using the ILP is very long, and increases exponentially with the system size. Thus, the mathematical formulation solution in is not scalable.

Accordingly, there is a need for an improved channel selection for the routing, wavelength assignment and spectrum allocation in flexible optical WDM networks.

BRIEF SUMMARY OF THE INVENTION

The present invention is directed to a greedy channel selection procedure for the routing, wavelength assignment and spectrum allocation in the flexible optical WDM Networks.

In an aspect of the invention, a method implemented in an optical flexible wavelength division multiplexing FWDM network, said method comprising the steps of: finding a connection route in an optical FWDM network on which a channel with sufficient spectrum is available at lowest wavelength among all available channels; finding K channels at first available K lower wavelengths out of available channels for minimizing total required spectrum; and selecting a channel which is routed through minimum number of optical fiber paths out of said K available channels at one of said lower wavelengths.

In a more specific aspect of the invention, a method implemented in a communications system including an optical flexible wavelength division multiplexing FWDM network includes finding an optimal set of line rates for a requested data rate of each connection in the FWDM using a channel selection for a total spectrum requirement for the set of line rates that is minimal; determining available channels with sufficient spectrum for each connection in a given set of each connection in a specific order; ascertaining K candidate channels on first available K wavelengths for each connection, all channels having distinct wavelengths with some channels co-existing on a same route connecting end users of the connection, K being number of channels to be considered for each the connection; and selecting, out of the K candidate channels, a channel routed through a minimum number of physical optical paths, the K channels being found on first available the K wavelengths for confining selection of a channel for a given the connection at lower wavelengths thereby reducing spectrum required for the connection.

These and other advantages of the invention will be apparent to those of ordinary skill in the art by reference to the following detailed description and the accompanying drawings.

DETAILED DESCRIPTION

Figure 1:
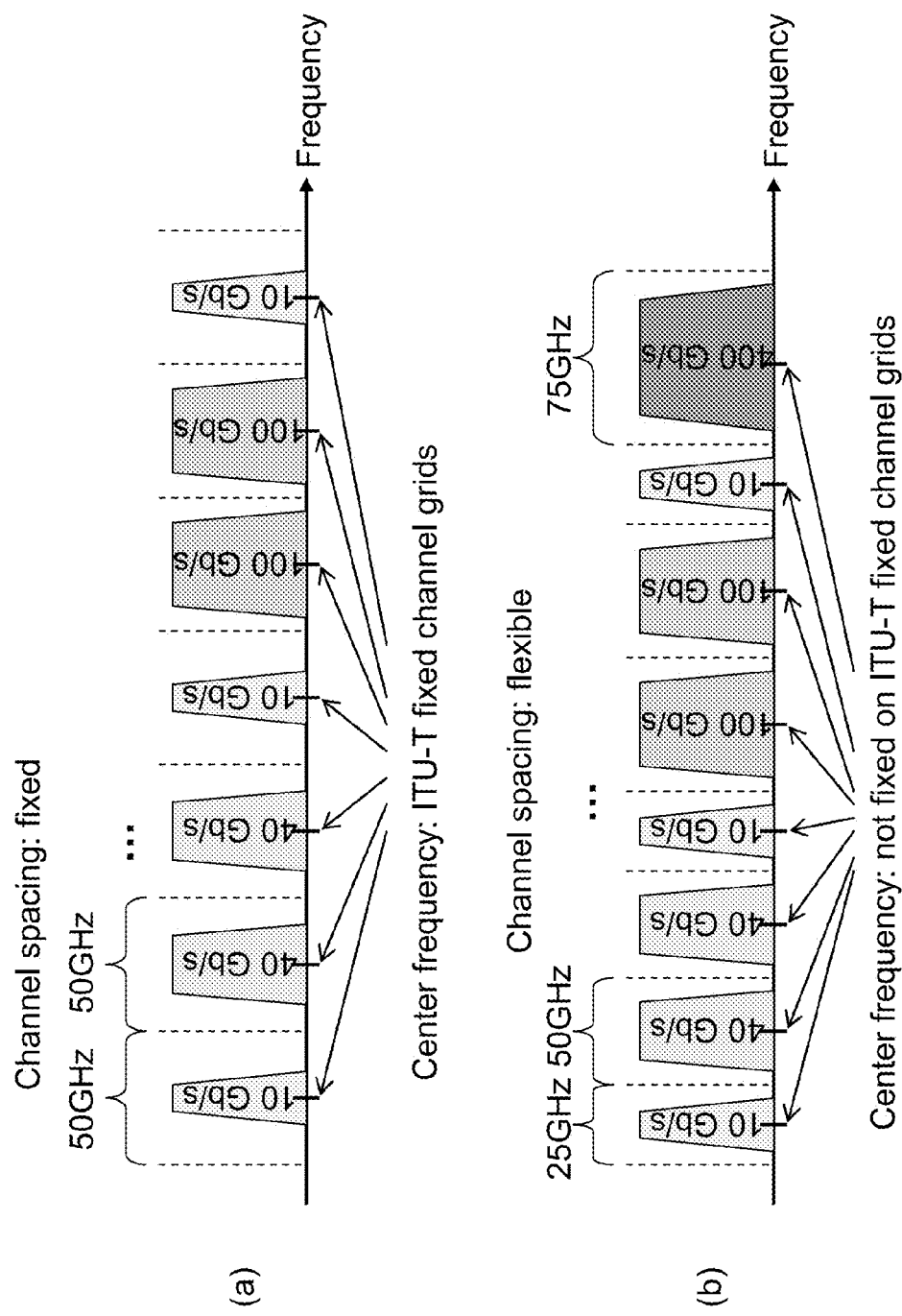
FIG. 1 depicts fixed transmission channel spacing and flexible transmission channel spacing to which the inventive method is directed.

The present invention is directed to a greedy channel selection procedure to solve the RWSA problem. It further improves the time efficiency. The greedy channel selection procedure reduces the time required to solve the RWSA problem compared to the K-alternate channel selection procedure while delivers approximately the same quality of a solution.

Applicants first introduce some terminologies in order to explain the inventive greedy channel selection procedure. In this method, Applicants assume that the given spectrum is discretized in the frequency domain in order to reduce the complexity of the RWSA problem. The smallest unit of a spectrum is referred to as a wavelength slot. Applicants also assume that the required spectrum by any line rate is larger than the spectrum of a wavelength slot. The spectrum can also be referred to in terms of the number of wavelength slots. In a fiber section, a wavelength slot can either be in the available state or the occupied state. No more than one channel can occupy a wavelength slot (spectrum), however an optical channel can occupy more than one consecutive wavelength slots. The state information of wavelength slots on a fiber cable or a route is referred as the spectrum availability information. The lower end of the consecutive wavelength slots is referred as the wavelength of a channel.

In the inventive greedy channel selection procedure, first is found the optimal set of line rates for the requested data rate of each connection using a channel selection procedure. The total spectrum, required for the set of line rates obtained through the channel selection procedure is minimum. Then is found the available channels with sufficient spectrum one by one for each connection in the given set of connections in a specific order. For each connection, the method finds K candidate channels on first available K wavelengths. All channels are having distinct wavelengths, but some channels may coexist on the same route connecting end users of the connection. Out of K candidate channels, the method selects a channel which is routed through minimum number of fiber cables. The K channels are found on first available K wavelengths, thus the proposed method confines the selection of a channel for a given connection at the lower wavelengths, which reduces the total required spectrum. On the other hand, finding K channels, and selecting a channel which is routed through minimum physical distance avoids overutilization of spectral resources due to longer length of a route.

As denoted herein, K is the number of channels to be considered for each connection, $\Delta$ is the given set of connections, $\Delta'$ is the set of connections obtained through channel selection procedure, $R^{sd}_\gamma$ is a connection with data rate $\gamma$ between end user s and d, $Y^{sd}$ is the physical shortest distance of a route connecting end user s with the end user d, L is a set of line rates supported by the network, l is the line rate of a channel, $x_l$ is the required spectrum for a channel operating at line rate l, $Z_e^w$ is the state of a wavelength slot, w, on fiber e (if the wavelength slot w is available on fiber e, then $Z_e^w$ is equal to 1, otherwise 0), $M_e$ is the state of availability of number of consecutive wavelength slots (equivalent to the spectrum), required for the line rate l of a connection, on a fiber e. (If $\lceil x_l/\delta \rceil$ amounts of consecutive wavelength slots are available on a fiber e, which is equivalent to the required spectrum $x_l$ for line rate l of a connection, then $M_e$ is initialized to 1, otherwise $M_e$ is initialized to zero), $L^\gamma$ is the optimal set of line rates obtained through channel selection procedure on data rate $\gamma$, $E_i$ is a set of fibers through which a channel i is routed. The spectrum of a wavelength slot is denoted as, $\delta$. The total number of such wavelength slots, W, can be given by the following formula.

$$W = \max_{l \in L} \lceil x_l/\delta \rceil |\Delta'| \qquad (1)$$

Figure 2A:
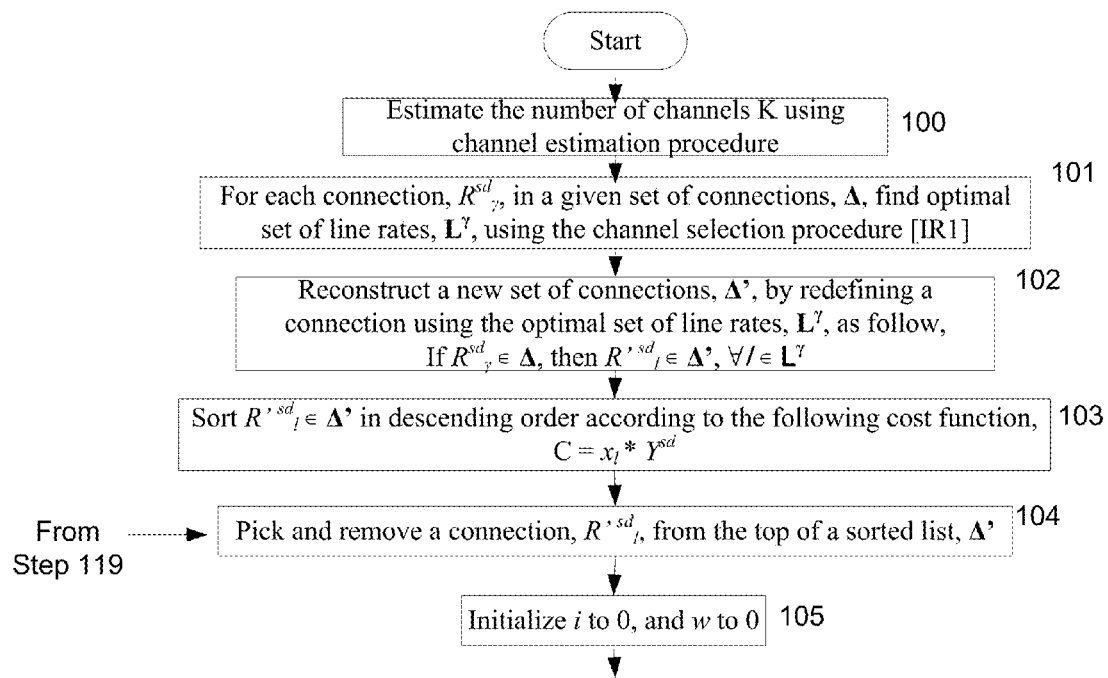
FIGS. 2A and 2B is a flow diagram of the greedy channel selection for the RWSA problem, in accordance with the invention.
Figure 2B:
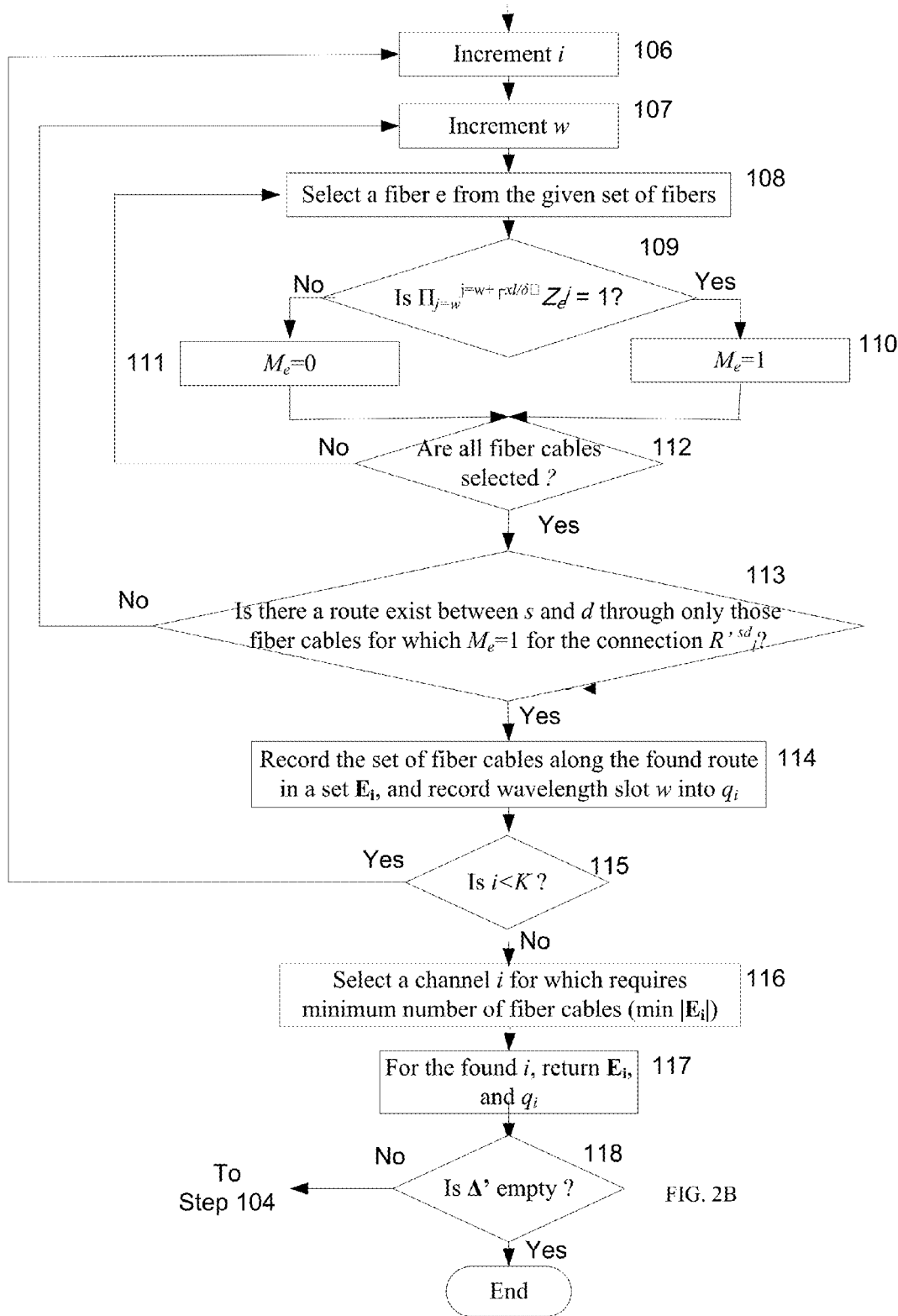

FIGS. 2A and 2B illustrates the flowchart for the inventive greedy channel selection procedure for the RWSA problem in the FWDM networks, and explain in detail as follow.

First 100 the method estimates the number of channels required for the proposed method using the channels estimation procedure.

The method 101 uses a channel selection procedure to find the optimal set of line rates, $L^\gamma$, for the requested data rate $\gamma$ by the connection $R^{sd}_\gamma$. The total spectrum of the set of line rates, $L^\gamma$, is minimum.

At step 102 the method redefines a connection based on a line rate instead of the requested data rate. For each given connection defined based on data rate, $R^{sd}_\gamma$, the method creates a new connection $R^{sd}_l$, where $l \in L^\gamma$. This procedure results in a new set of requests, $\Delta'$. Then 103 the method sorts the connections of a set, $\Delta'$, in descending order of a cost function, C, which is the multiplication of the required spectrum by a connection and the shortest distance of a connection, $(x_l * Y^{sd})$. This cost function is proportional to the spectrum requirement of the connection, and the shortest physical distance of the route connecting end users of the connection. The reason behind this strategy is that the probability of availability of channel at lower wavelengths decreases as the required spectrum increases. Similarly, the probability of availability of channels at lower wavelength decreases as the length of the connection increases. Thus, by giving a higher priority to those connections, which require large amount of spectrum, and with large physical distance between the end users, we increase the probability of successfully establishing them at lower wavelengths.

After the prior sorting, the method 104 selects and removes a connection from the sorted list, $\Delta'$. Then the method 105 initializes the index of a channel and index of the wavelength slot to zero. The index of a channel is incremented 106. The index of a wavelength slot is incremented 107. A fiber cable is selected from the given set of fibers 108.

At the next step 109, the method checks the availability of the consecutive wavelength slots starting from a current wavelength slot, w, up to wavelength slot, $w + \lceil x_l/\delta \rceil$, which is equivalent to the required spectrum for the line rate l by the given connection. If the consecutive wavelength slots are available than the method proceeds to step 110, otherwise the method proceeds to step 111. At step 110, the method initializes the state of a fiber to 1. At step 111, the method initializes the state of a fiber to 0.

Then the method 112 checks whether availability of consecutive wavelength slot is determined for all fiber cables. If there is any fiber left, then the method repeats steps starting from 108 up to 111, otherwise the method proceeds to the step 113. At step 113, the method finds the route between the end users of a connection through only those fibers for which the state is 1. If there exist a route then the method proceeds to step 114, otherwise the method repeats the steps starting from 107 up to 112.

A step 114, the found route is recoded into set $E_i$, and the index of the current wavelength slot is stored in to $q_i$, which represent the route and a wavelength for the $i^{th}$ channel. Here, starting from steps 107 up to 114, the method finds a route on which a channel, operating at wavelength, w, and having enough spectrum for the requested line rate, is available.

In the next step 115, the method checks whether we already found at least K channels for a connection. If method already found K channels, then it proceeds to the step 116, otherwise the method repeats steps starting from 106 up to 114. Here, starting from step 106 up to 115, K channels which can supper the connection are found. These are the channels on first available K wavelengths. In this step 116, the method selects a channel which is routed through minimum number of fiber cables.

Next 117, for the found channel in the step 116, the method returns the corresponding route and wavelength on which the required spectrum for the requested line rate of the connection is available. Here, in steps 116 and 117, the method finds a channel with minimum physical distance.

At step 118 the method checks whether there was found the solution for all connection in the set, $\Delta'$. If there is still any connection left to be routed then the method repeats steps from 104 up to 117, otherwise the method is terminated.

Figure 3:
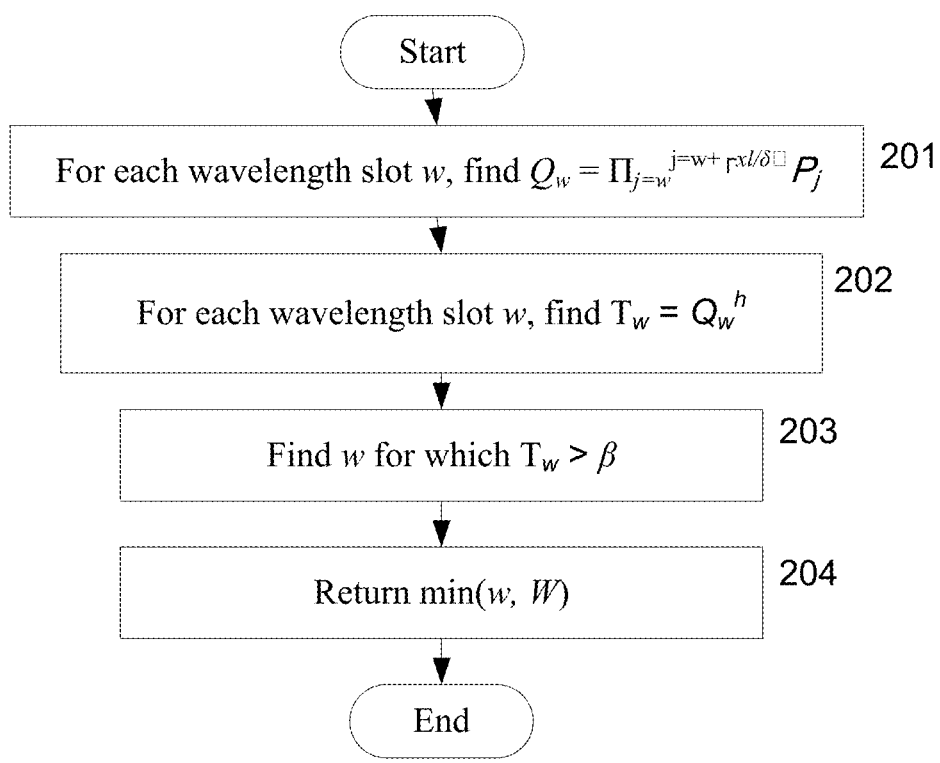
FIG. 3 is a flow chart of a channel estimation used by the greedy channel selection of FIGS. 2A and 2B, in accordance with the invention.

In FIG. 3, there is illustrated a flowchart for the procedure to find the estimation on number of channels for the greedy channel selection procedure for the RWSA problem in the FWDM networks, and explain in detail as follow. If given the probability of availability of a wavelength slot, $P_w$, and average number of fiber cable, h, on shortest routes of a connection, then the following procedure finds the upper limit on the number of channels needed for the proposed method with a confidence level of $\beta$. We assume that the traffic load is equally distributed among all fiber cables in the network.

Initially, 201 the method finds the probability of availability of $w+\lceil x_i/\delta \rceil$ consecutive wavelength slots starting from wavelength slot w, $Q_w$, on a fiber. 202: Then the probability of availability of $w+\lceil x_i/\delta \rceil$ consecutive wavelength slots on a shortest path is found 202. Followed 203 by finding the wavelength slot, w, for which the probability of availability of consecutive time slots, $T_w$, is at least $\beta$. Lastly, the method finds 204 the number of channels in the greedy channel selection procedure is either w, found in the step 203, or $\max_{l \in L} \lceil x_l/\delta \rceil |\Delta'|$, which presents the maximum number of wavelength slots, whichever is minimum.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

The invention claimed is:

1. A method implemented by a computer in a communications system including an optical flexible wavelength division multiplexing FWDM network, comprising the steps of:
    i) finding an optimal set of line rates for a requested data rate of each connection in said FWDM using a channel selection for a total spectrum requirement for said set of line rates that is minimal;
    ii) determining available channels with sufficient spectrum for each said connection in a given set of said each connection in a specific order;
    iii) ascertaining K candidate channels on first available K wavelengths for each said connection, all channels having distinct wavelengths with some channels co-existing on a same route connecting end users of said connection, K being number of channels to be considered for each said connection; and
    iv) selecting, out of said K candidate channels, a channel routed through a minimum number of physical optical paths, said K channels being found on first available said K wavelengths for confining selection of a channel for a given said connection at lower wavelengths thereby reducing spectrum required for said connection;
    wherein the steps i)-iv) are carried out by a computer.

2. A method implemented by a computer in an optical flexible wavelength division multiplexing FWDM network, said method comprising:
    i) finding a connection route in an optical FWDM network on which a channel with sufficient spectrum is available at lowest wavelength among all available channels;
    ii) finding K channels at first available K lower wavelengths out of available channels for minimizing total required spectrum; and
    iii) selecting a channel which is routed through minimum number of optical fiber paths out of said K available channels at one of said lower wavelengths;
    wherein the steps i)-iii) are carried out by a computer.

* * * * *